US012617415B2

(12) United States Patent
Tanaka

(10) Patent No.: US 12,617,415 B2
(45) Date of Patent: May 5, 2026

(54) HANDS-FREE STATE DETERMINATION DEVICE FOR VEHICLE

(71) Applicant: TOYOTA JIDOSHA KABUSHIKI KAISHA, Toyota (JP)

(72) Inventor: Takanori Tanaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 18/651,090

(22) Filed: Apr. 30, 2024

(65) Prior Publication Data

US 2025/0010871 A1 Jan. 9, 2025

(30) Foreign Application Priority Data

Jul. 3, 2023 (JP) ................................. 2023-109218

(51) Int. Cl.
 *B60W 50/08* (2020.01)
 *B60W 50/00* (2006.01)
(52) U.S. Cl.
 CPC ..... *B60W 50/08* (2013.01); *B60W 2050/0083* (2013.01); *B60W 2510/202* (2013.01); *B60W 2540/223* (2020.02)
(58) Field of Classification Search
 CPC ......... B60W 50/08; B60W 2050/0083; B60W 2510/202; B60W 2540/223; B60W 40/09; B62D 15/0245; B62D 15/025; B62D 5/0463; B62D 6/10; G01L 5/221
 See application file for complete search history.

(56) References Cited

U.S. PATENT DOCUMENTS

| | | | |
|---|---|---|---|
| 10,310,508 B2 | 6/2019 | Kunisa et al. | |
| 10,654,482 B2 | 5/2020 | Urano et al. | |
| 11,260,868 B2 | 3/2022 | Urano et al. | |
| 11,320,824 B2 | 5/2022 | Niikuni | |
| 2011/0187862 A1 | 8/2011 | Ishikawa | |
| 2015/0025745 A1* | 1/2015 | Tamura ................... | B62D 6/00 |
| | | | 701/41 |
| 2016/0009311 A1* | 1/2016 | Khale ................. | B62D 15/025 |
| | | | 74/530 |
| 2016/0167707 A1* | 6/2016 | Lee ..................... | B62D 15/029 |
| | | | 701/41 |

(Continued)

FOREIGN PATENT DOCUMENTS

| | | |
|---|---|---|
| JP | 2011-121554 A | 6/2011 |
| JP | 2020-083054 A | 6/2020 |
| JP | 2020-117025 A | 8/2020 |

*Primary Examiner* — Sze-Hon Kong
(74) *Attorney, Agent, or Firm* — Sughrue Mion, PLLC

(57) ABSTRACT

A hands-free state determination device including: a torque imparting device configured to apply control torque to a steering transmission system between a steering wheel and a steered wheel; a steering torque sensor provided in the steering transmission system between the steering wheel and the torque imparting device; and a control unit configured to determine that the driver is in a hands-free state in which the steering wheel is not held when the steering torque detected by the steering torque sensor is within a first predetermined range, wherein the control unit performs variable setting of the first predetermined range based on the steering torque detected by the steering torque sensor in a situation where it is determined that the torque is not input to the steering torque sensor.

5 Claims, 6 Drawing Sheets

(56)  References Cited

U.S. PATENT DOCUMENTS

| | | | |
|---|---|---|---|
| 2017/0015351 A1* | 1/2017 | Endo | B62D 6/00 |
| 2017/0029021 A1* | 2/2017 | Lee | B62D 15/025 |
| 2018/0172528 A1* | 6/2018 | Kim | B60W 40/08 |
| 2019/0168802 A1* | 6/2019 | Matsumura | B62D 5/0463 |
| 2019/0286127 A1* | 9/2019 | Watanabe | G05D 1/0061 |
| 2019/0347492 A1 | 11/2019 | Morimura et al. | |
| 2020/0108853 A1* | 4/2020 | Moreillon | B62D 7/09 |
| 2020/0189655 A1* | 6/2020 | Ahn | G01L 5/221 |
| 2020/0361530 A1* | 11/2020 | Polmans | B62D 5/001 |
| 2021/0061309 A1 | 3/2021 | Kawana | |
| 2022/0048508 A1 | 2/2022 | Urano et al. | |
| 2022/0289273 A1* | 9/2022 | Ham | B62D 6/00 |
| 2023/0294762 A1* | 9/2023 | Millsap | B60W 60/0053 |
| | | | 701/41 |
| 2023/0382298 A1* | 11/2023 | Yoshida | A61B 5/18 |
| 2024/0199062 A1* | 6/2024 | Park | B60W 40/08 |

* cited by examiner

FIG. 1

HANDS-FREE STATE DETERMINATION DEVICE FOR VEHICLE

CROSS-REFERENCE TO RELATED APPLICATION

This application claims priority to Japanese Patent Application No. 2023-109218 filed on Jul. 3, 2023, incorporated herein by reference in its entirety.

BACKGROUND

1. Technical Field

The disclosure relates to a hands-free state determination device for a vehicle such as an automobile.

2. Description of Related Art

Well-known examples of an automated driving device for a vehicle such as an automobile include a steering assisting device such as a lane keeping assisting device that controls a lateral-direction position of the vehicle with respect to a lane by automated steering, a lane departure suppressing device, a lane change assisting device, and so forth.

Steering assistance by the steering assisting device may be performed on the assumption that a driver is gripping a steering wheel. When the driver is not gripping the steering wheel, a situation in which the magnitude of steering torque is small continues, and accordingly, performing determination of whether the driver is in a hands-free state of not holding the steering wheel, based on the steering torque detected by a steering torque sensor, is known.

For example, Japanese Unexamined Patent Application Publication No. 2020-117025 (JP 2020-117025 A) describes hands-free state determination technology in which, when a determination that the magnitude of the steering torque detected by the steering torque sensor is less than a reference value is consecutively made a predetermined number of times, determination is made that the hands of the driver are free from the steering wheel. According to the hands-free state determination technology, the hands-free state of the driver can be detected without requiring an expensive sensor such as a touch sensor.

SUMMARY

When the vehicle is in a straight traveling state and neither automated steering nor steering by the driver is being performed, no torque acts on the steering torque sensor, and accordingly the steering torque detected by the steering torque sensor is 0.

However, when there is error in assembly of the steering device or the steering torque sensor, output error may occur in which the steering torque detected by the steering torque sensor is a value other than 0, even when the vehicle is in the straight traveling state and neither automated steering nor steering by the driver are being performed. Further, output error of the steering torque sensor may occur when there is misalignment in wheel alignment of steered wheels, right-left weight balance of the vehicle, and so forth.

When output error of the steering torque sensor occurs due to the above-described factors, the magnitude of the steering torque detected by the steering torque sensor may become equal to or greater than the reference value due to the output error, and the driver may be erroneously determined not to be in the hands-free state, despite the driver being in the hands-free state.

The disclosure provides a hands-free state determination device that is improved so as to be capable of reducing a likelihood of a determination as to whether the driver is in a hands-free state being an erroneous determination, even when output error of the steering torque sensor occurs due to a factor such as assembly error of the steering device.

According to the disclosure, provided is a hands-free state determination device for a vehicle, including a torque imparting device that is configured to impart a control torque to a steering transmission system between a steering wheel and a steered wheel, a steering torque sensor that is provided in the steering transmission system, between the steering wheel and the torque imparting device, and a control unit that is configured to determine that a driver is in a hands-free state, in which the driver is not gripping the steering wheel, when a steering torque detected by the steering torque sensor is within a first predetermined range.

The control unit is configured to perform a variable setting of the first predetermined range, based on the steering torque detected by the steering torque sensor, in a situation in which determination is made that no torque is being input to the steering torque sensor.

According to the above configuration, the first predetermined range is variably set based on the steering torque detected by the steering torque sensor in the situation in which determination is made that no torque is being input to the steering torque sensor. Steering torque that is detected by the steering torque sensor in the situation in which determination is made that no torque is being input to the steering torque sensor is output error of the steering torque sensor, due to a factor such as assembly error of the steering device or the like. Accordingly, the first predetermined range can be variably set based on output error of the steering torque sensor. Thus, in a situation in which output error of the steering torque sensor is occurring due to a factor such as assembly error of the steering device or the like, the likelihood of a determination as to whether the driver is in a hands-free state being an erroneous determination due to the output error can be reduced, in comparison with a case in which the first predetermined range is not variably set.

In one aspect of the disclosure, the first predetermined range is a range between a value obtained by subtracting a predetermined value from a reference torque and a value obtained by adding the predetermined value to the reference torque, and the control unit is configured to perform the variable setting of the first predetermined range by setting the steering torque detected by the steering torque sensor as the reference torque in the situation in which determination is made that no torque is being input to the steering torque sensor.

According to the above aspect, the first predetermined range is the range between the value obtained by subtracting the predetermined value from the reference torque and the value obtained by adding the predetermined value to the reference torque, and the steering torque detected by the steering torque sensor is the reference torque in the situation in which determination is made that no torque is being input to the steering torque sensor. Accordingly, the first predetermined range can be variably set, by variably setting the reference torque based on the steering torque detected by the steering torque sensor in the situation in which determination is made that no torque is being input to the steering torque sensor.

In another aspect of the disclosure, the control unit is configured to determine that no torque is being input to the steering torque sensor from the steered wheel side, when determining that the vehicle is traveling straight, and that the vehicle is traveling in a middle of a lane, and that a road surface is not laterally inclined.

When determination is made that the vehicle is traveling straight, the vehicle is traveling in the middle of the lane, and the road surface is not laterally inclined, no torque acts on the steering torque sensor from the steered wheel side. Thus, according to the above aspect, the situation in which no torque is being input to the steering torque sensor from the steered wheel side can be determined.

In another aspect of the disclosure, the control unit is configured to determine that no torque is being input to the steering torque sensor from the steered wheel side, when determining that the vehicle is in a state of traveling straight, and that a magnitude of a lateral force acting on the vehicle is no greater than a reference value for lateral force determination, and that a magnitude of the control torque is no greater than a reference value for control torque determination.

When determination is made that the vehicle is in the state of traveling straight, the magnitude of the lateral force acting on the vehicle is no greater than the reference value for lateral force determination, and the magnitude of the control torque is no greater than the reference value for control torque determination, no torque is acting on the steering torque sensor from the steered wheel side. Thus, according to the above aspect, the situation in which no torque is being input to the steering torque sensor from the steered wheel side can be determined.

In another aspect of the disclosure, the control unit is configured to determine that no torque is being input to the steering torque sensor from the steering wheel side, when the steering torque detected by the steering torque sensor is within a second predetermined range that is greater than the first predetermined range, in a situation in which no torque is being input to the steering torque sensor from the steered wheel side.

When the driver lightly holds the steering wheel without performing steering operations in the situation in which no torque is being input to the steering torque sensor from the steered wheel side, the magnitude of the steering torque detected by the steering torque sensor does not become a large value. According to the above aspect, when the steering torque detected by the steering torque sensor is within the second predetermined range that is greater than the first predetermined range, determination is made that no torque is being input to the steering torque sensor from the steering wheel side. Thus, a situation can be determined in which the driver is lightly holding the steering wheel without performing steering operations, and no torque is being input to the steering torque sensor from the steering wheel side.

Other objects, other features and accompanying advantages of the disclosure will be readily understood from the description of embodiments of the disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic configuration diagram illustrating a hands-free state determination device according to an embodiment;

DETAILED DESCRIPTION OF EMBODIMENTS

Figure 2:
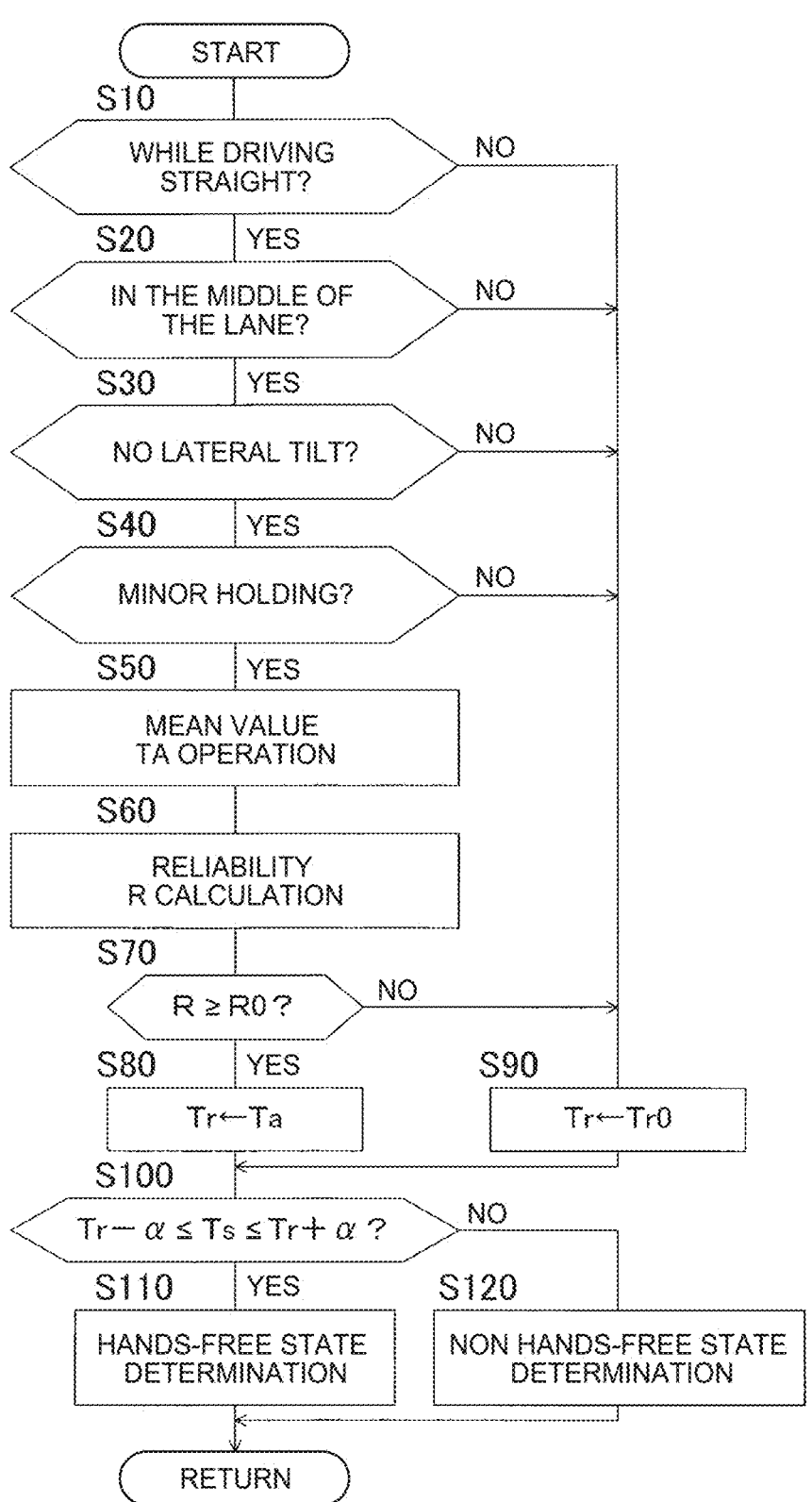
FIG. 2 is a flowchart illustrating a hands-free state determination control routine according to the first embodiment.

Embodiments of the present disclosure will now be described in detail with reference to the accompanying drawings.

Figure 1:
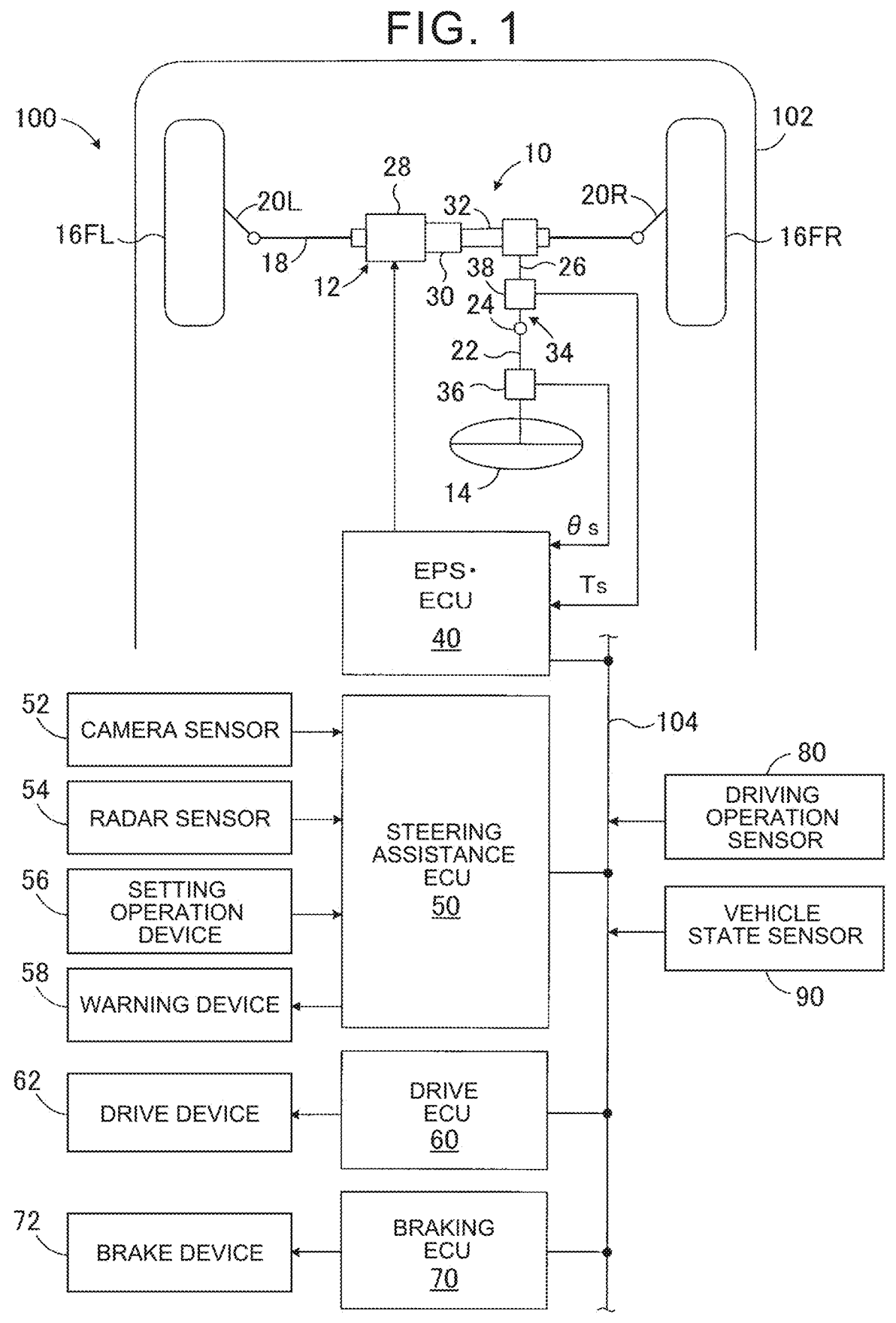

As shown in of FIG. 1, the hands-free state determination device 100 according to the embodiment includes a steering device 10, an electric power steering ECU 40, and a steering assistance ECU 50, and is applied to a vehicle 102 including a drive ECU 60 and a braking ECU 70 and capable of autonomous driving. In this specification, the electric power steering is referred to as Electric Power Steering (EPS) as needed.

EPS·ECU 40, the steering assistance ECU 50, the drive ECU 60, and the braking ECU 70 are electronic control units including a microcomputer as a main part, and are connected to each other via a Controller Area Network (CAN) 104 so as to be able to transmit and receive data. Each of the microcomputers includes a central processing unit (CPU), a read-only memory (ROM), a random access memory (RAM), a non-volatile memory, an interface, and the like. The CPU realizes various functions by executing instructions (programs, routines) stored in the ROM. These ECU may be integrated into one ECU.

As shown in FIG. 1, the steering device 10 includes a EPS device 12 connected to a EPS·ECU 40, and EPS device 12 is configured as a rack-and-pinion type EPS device that is driven in response to manipulation of the steering wheel 14 by a driver. The rack bar 18 of EPS device 12 is connected via tie rods 20L and 20R to knuckle arms (not shown) of front wheels 16FL and 16FR that are steered wheels. The steering wheel 14 is connected to the pinion shaft 26 of EPS device 12 via a steering shaft 22 and a universal joint 24.

In the illustrated embodiment, EPS device 12 is a rack-assisted electric power steering device, and includes an electric motor 28 and a belt-type converter 30, for example, that converts the rotation and torque of the electric motor 28 into a displacement and a force in the reciprocating direction and transmits the displacement and the force to the rack bar 18. EPS device 12 drives the rack bar 18 relative to the housings 32 to generate control torques.

Therefore, the steering shaft 22, the universal joint 24, the pinion shaft 26, EPS device 12, and the tie rod 20L, 20R constitute a steering transmission system 34 that transmits the displacement and torque of the steering between the steering wheel 14 and the front wheel 16FL and 16FR. EPS device 12 functions as a torque imparting device that cooperates with EPS·ECU 40 to impart a control torque Tc to the steering transmission system 34.

The steering shaft 22 is provided with a steering angle sensor 36 for detecting the steering angle θs, and the pinion shaft 26 is provided with a steering torque sensor 38 for detecting the steering torque Ts. Although not specifically shown in FIG. 1, the steering torque sensor 38 detects the steering torque Ts as a difference in the rotational angle of the member on the side of the steering wheel 14 and the member on the side of EPS device 12 with respect to the elastically torsionally deformable torsion bar, i.e., a value proportional to the relative rotational angle. The steering torque sensor 38 may be provided on the steering shaft 22.

It is assumed that the steering angle θs and the steering torque Ts are positive when the vehicle 102 turns to the left by the driver's steering operation. EPS device 12 may be a pinion-assisted or column-assisted EPS device as long as control torque is imparted to the steering transmission system 34 between the front wheels 16FL and 16FR and the steering torque sensor 38.

EPS·ECU 40 controls the steering assist torque by controlling EPS device 12 in a manner known in the art on the basis of the steering torque Ts and the vehicle speed V detected by the driving operation sensor 80 and the vehicle state sensor 90, which will be described later, to reduce the steering burden on the driver. Further, EPS·ECU 40 can steer the front wheel 16FL and 16FR as needed by controlling EPS device 12. Thus, EPS. ECU 40 and EPS device 12 functions as an automatic steering device that automatically steers the front wheels as needed.

A camera sensor 52 and a radar sensor 54 are connected to the steering assistance ECU 50. The camera sensor 52 and the radar sensor 54 each include a plurality of camera devices and a plurality of radar devices. The camera sensor 52 and the radar sensor 54 function as a target information acquisition device that acquires information on a target at least in front of the vehicle 102. In addition to the radar sensor 54, or in addition to the radar sensor 54, Light Detection And Ranging (LiDAR) may be used.

Further, a setting operation device 56 and an alarm device 58 are connected to the steering assistance ECU 50, and the setting operation device 56 is provided at a position operated by the driver. Although not shown in FIG. 1, in an embodiment, the setting operation device 56 includes a LTA switch, and the steering assistance ECU 50 executes LTA when LTA switch is on. Note that LTA switching may be omitted. Note that LTA means Lane Tracing Assist Control.

The alarm device 58 is activated when it is determined that the driver does not hold the steering wheel 14, and issues an alarm, that is, an alarm indicating that the driver is in the hands-free state. The alarm device 58 may be any of an indicator, an alarm device for issuing a visual alarm such as an alarm lamp, an alarm device for issuing an audible alarm such as an alarm buzzer, and an alarm device for issuing a sensory alarm such as vibration of a seat, or any combination thereof.

The drive ECU 60 is connected to a drive device 62 that accelerates the vehicle 102 by imparting a driving force to driving wheels not shown in FIG. 1. In a normal state, the drive ECU 60 controls the drive device so that the driving force generated by the drive device 62 changes in response to a driving operation by the driver, and when a command signal is received from the steering assistance ECU 50, controls the drive device 62 based on the command signal.

A braking device 72 is connected to the braking ECU 70 to decelerate the vehicle 102 by braking by imparting braking force to wheels not shown in of FIG. 1. In a normal state, the braking ECU 70 controls the braking device so that the braking force generated by the braking device 72 changes in accordance with the braking operation by the driver, and when a command signal is received from the steering assistance ECU 50, automatically braking is performed by controlling the braking device 72 based on the command signal.

The driving operation sensor 80 and the vehicle state sensor 90 are connected to CAN 104. Information (referred to as sensor information) detected by the driving operation sensor 80 and the vehicle state sensor 90 is transmitted to CAN 104. The driving operation sensor 80 includes a driving operation amount sensor and a braking operation amount sensor. The vehicle state sensor 90 includes a vehicle speed sensor, a longitudinal acceleration sensor, a lateral acceleration sensor, a yaw rate sensor, and the like.

The steering assistance ECU 50 is a central control device that performs steering assistance control. In an embodiment, the steering assistance ECU 50 performs LTA in cooperation with other ECU. The steering assist control of LTA or the like is performed on the assumption that the driver is holding the steering wheel 14. Therefore, in the first to fourth embodiments described later, the steering assistance ECU 50 executes the hands-free state determination control for determining whether or not the driver is releasing the steering wheel 14 without gripping the steering wheel. When the steering assistance ECU 50 determines that LTA is hands-free state during the execution of the steering operation, it activates the alarm device 58 to issue an alarm, and gradually decreases the control quantity of LTA to terminate LTA. It should be noted that the control of LTA is well known in the art and does not constitute the gist of the present disclosure, and therefore will not be described.

First Embodiment

In the first embodiment, ROM of the steering assistance ECU 50 stores a program of the hands-free state determination control corresponding to the flow chart shown in FIG. 2. The hands-free state determination control by the flow chart shown in FIG. 2 is repeatedly executed at predetermined intervals by CPU of the steering assistance ECU 50 when LTA switch not shown in the setting operation device 56 in FIG. 1 is on and LTA is being executed. Note that this also applies to the hands-free state determination control of another embodiment described later. Further, at the start of the hands-free state determination control, the reliability R to be described later is initialized to 0.

In S10, CPU determines whether or not the vehicle 102 is traveling straight. CPU advances the present control to S90 when a negative determination is made, and advances the present control to S20 when an affirmative determination is made. In this case, the curvature of the lane may be estimated based on the image of the front of the vehicle 102 captured by the camera sensor 52, and the inclination angle of the traveling direction of the vehicle 102 with respect to the lane may be estimated. Further, for example, when the absolute value of the curvature of the lane is equal to or less than the reference value of the curvature determination (positive constant) and the absolute value of the inclination angle in the traveling direction is equal to or less than the reference value of the inclination angle determination (positive constant), it may be determined that the vehicle 102 is in the straight traveling state. The determination of the inclination angle in the traveling direction may be omitted.

In S20, CPU determines whether or not the vehicle 102 is traveling in the middle of the lane. CPU advances the present control to S90 when a negative determination is made, and advances the present control to S30 when an affirmative determination is made. In this case, for example, the magnitude of the deviation amount of the lateral position of the center of the vehicle 102 in the vehicle width direction with respect to the middle of the lane in the width direction may be estimated. Further, it may be determined that the vehicle 102 is traveling in the middle of the lane when a situation in which the magnitude of the deviation amount of the lateral position is equal to or smaller than the reference value (positive constant) of the deviation amount determination is continued to be equal to or larger than the first reference time (positive constant).

In S30, CPU determines whether there is a lateral slope on the road surface. CPU advances the present control to S90 when a negative determination is made, that is, when it is determined that there is a lateral slope on the road surface, and advances the present control to S40 when an affirmative determination is made. In this case, when the absolute value of the lateral acceleration Gy of the vehicle 102 detected by the lateral acceleration sensor of the vehicle state sensor 90 is equal to or less than the reference value (positive constant) of the lateral acceleration and the absolute value of the yaw rate Yr of the vehicle 102 detected by the yaw rate sensor is equal to or less than the reference value (positive constant) of the yaw rate, it may be determined that there is no lateral inclination on the road surface.

In S40, CPU determines whether or not the driver lightly holds the steering wheel 14 without performing a steering operation. CPU advances the present control to S90 when a negative determination is made, and advances the present control to S50 when an affirmative determination is made. In this case, it may be determined that the driver lightly holds the steering wheel 14 when the state in which the steering torque Ts detected by the steering torque sensor 38 is within the second predetermined range that is equal to or greater than the lower limit Trf−β and equal to or less than the upper limit Trf+β continues for the second reference time (positive constant) or more. Note that β may be a positive constant larger than α in S100 described later, and Trf is the previous value of the reference value Tr of the hands-free state determination set in S80 or S90 described later.

In S50, CPU calculates the mean value Ta of the steering torque Ts detected by the steering torque sensor 38. In this case, the steering torque Ts for calculating the mean value Ta may be limited to a value from the present time to a preset time or a value of a preset number of control cycles.

In S60, CPU calculates the reliability R by adding 1 to the previous reliability R. Note that the reliability R may be reset to 0 when the traveling of the vehicle 102 is completed.

In S70, CPU determines whether or not the reliability R is equal to or greater than a reference value R0. When an affirmative determination is made, CPU sets the reference value Tr of the hands-free condition determination to the mean value Ta calculated in S50 in S80. On the other hand, when a negative determination is made, CPU sets the reference value Tr of the hands-free condition determination to a preset reference value Tr0 (for example, 0).

In S100, CPU determines whether or not the steering torque Ts detected by the steering torque sensor 38 is within a first predetermined range equal to or greater than the lower limit value Tr−α and equal to or less than the upper limit value Tr+α, where α is a positive constant. When an affirmative determination is made, CPU determines that the driver is in the hands-free state in S110, and activates the alarm device 58 to issue an alarm indicating that the driver is in the hands-free state. On the other hand, when a negative determination is made, CPU does not determine that the driver is hands-free state in S120, and stops the alarm when the driver is issuing the alarm, and then ends the present control once. Note that CPU temporarily ends the present control when the alarm is not issued.

According to the first embodiment, when the vehicle 102 is traveling straight and the vehicle is traveling in the middle of the lane and the road surface is not laterally inclined, an affirmative determination is made in S10 to S30. Therefore, according to S10 to S30, it is possible to determine a condition in which the torque is not inputted to the steering torque sensor 38 from the front wheel 16FL, 16FR that is the steered wheels. Further, when the condition in which the torque Ts detected by the steering torque sensor is within the second predetermined range larger than the first predetermined range continues for the second reference period or longer, an affirmative determination is made in S40. Therefore, according to S40, it is possible to determine a condition in which the torque is not inputted to the steering torque sensor from the steering wheel 14.

Second Embodiment

Figure 3:
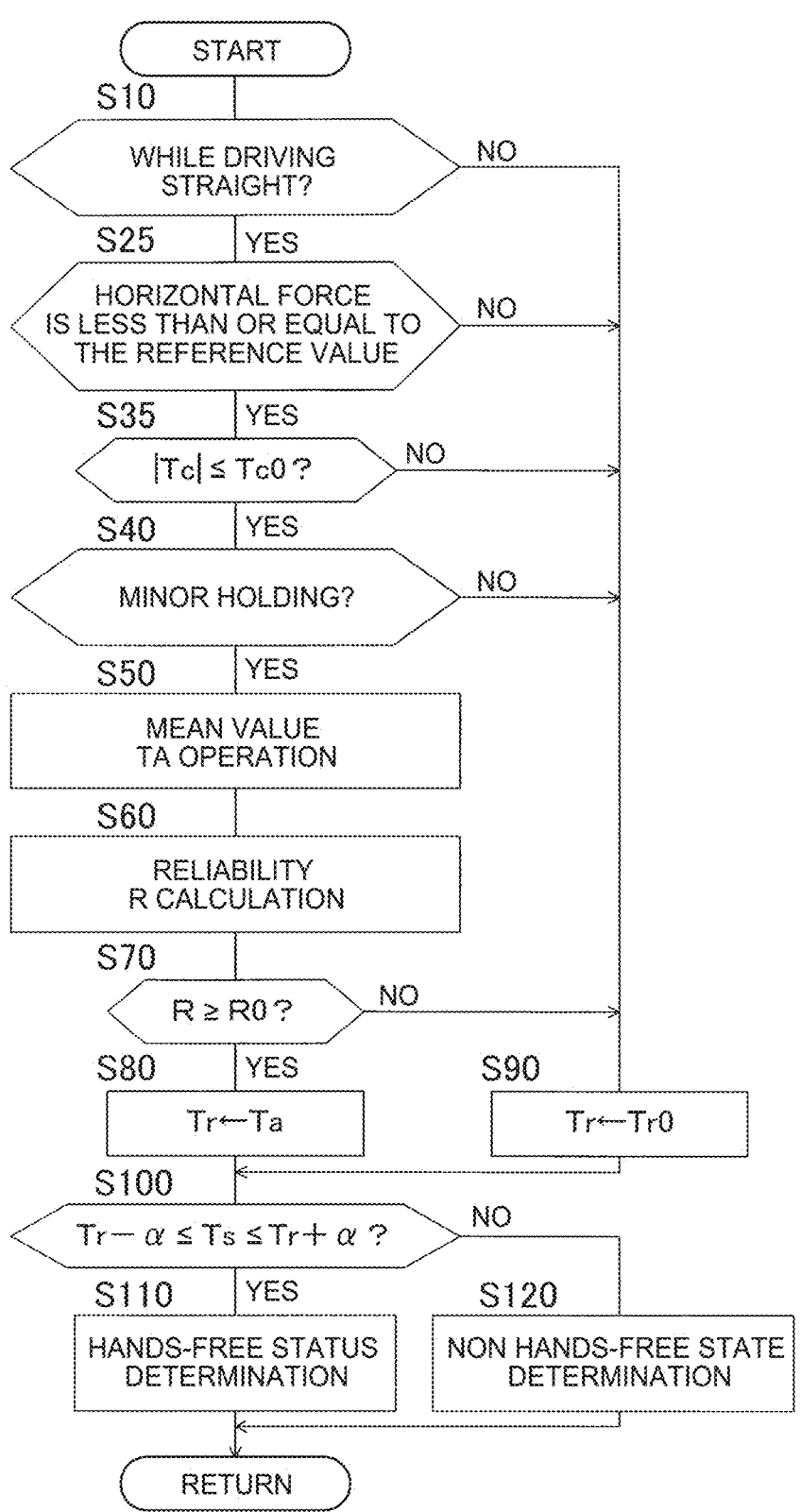
FIG. 3 is a flowchart illustrating a hands-free state determination control routine according to the second embodiment.

In the second embodiment, ROM of the steering assistance ECU 50 stores a program of the hands-free state determination control corresponding to the flow chart shown in of FIG. 3. The hands-free state determination control by the flow chart shown in FIG. 3 is repeatedly executed at predetermined intervals by CPU of the steering assistance ECU 50 when LTA switch, which is not shown in the setting operation device 56 in FIG. 1 and LTA is being executed.

As can be seen from a comparison of FIG. 3 with FIGS. 2, S10 and S40 to S120 are executed in the same manner as in the first embodiment, and when an affirmative determination is made in S10, S25 is executed.

In S25, CPU determines whether the magnitude of the lateral force acting on the vehicle 102 is less than or equal to a reference value of the lateral force. CPU advances the present control to S90 when a negative determination is made, and advances the present control to S35 when an affirmative determination is made. In this case, when the absolute value of the lateral acceleration Gy of the vehicle 102 detected by the lateral acceleration sensor of the vehicle state sensor 90 is equal to or less than the reference value (positive constant) of the lateral acceleration and the absolute value of the yaw rate Yr of the vehicle 102 detected by the yaw rate sensor is equal to or less than the reference value (positive constant) of the yaw rate, it may be determined that the magnitude of the lateral force acting on the vehicle is equal to or less than the reference value of the lateral force.

The lateral acceleration Gy of the vehicle 102 may be replaced with an estimated lateral acceleration calculated based on the steering angle θs detected by the steering angle sensor 36 and the vehicle speed detected by the vehicle speed sensor. Further, the determination of the yaw rate may be omitted.

In S35, CPU determines whether or not the absolute value of the control torque Tc imparted by EPS device 12 to the steering transmission system 34 is equal to or less than the reference value Tc0 (positive constant) of the control torque. CPU advances the present control to S90 when a negative determination is made, and advances the present control to S40 when an affirmative determination is made.

According to the second embodiment, when it is determined that the vehicle 102 is traveling straight and the lateral force acting on the vehicle is equal to or less than the reference value and the magnitude of the control torque Tc is equal to or less than the reference value, an affirmative determination is made in S10, S25 and S35. Therefore, according to S10, S25 and S35, it is possible to determine a condition in which the torque is not inputted to the steering torque sensor 38 from the front wheel 16FL, 16FR that is the steered wheels. In addition, as in the first embodiment, when the condition in which the torque Ts detected by the steering torque sensor is within the second predetermined range larger than the first predetermined range continues for the second reference period or longer, an affirmative determination is made in S40. Therefore, it is possible to determine a situation in which the torque is not input to the steering torque sensor from the steering wheel 14 side.

Third Embodiment

Figure 4:
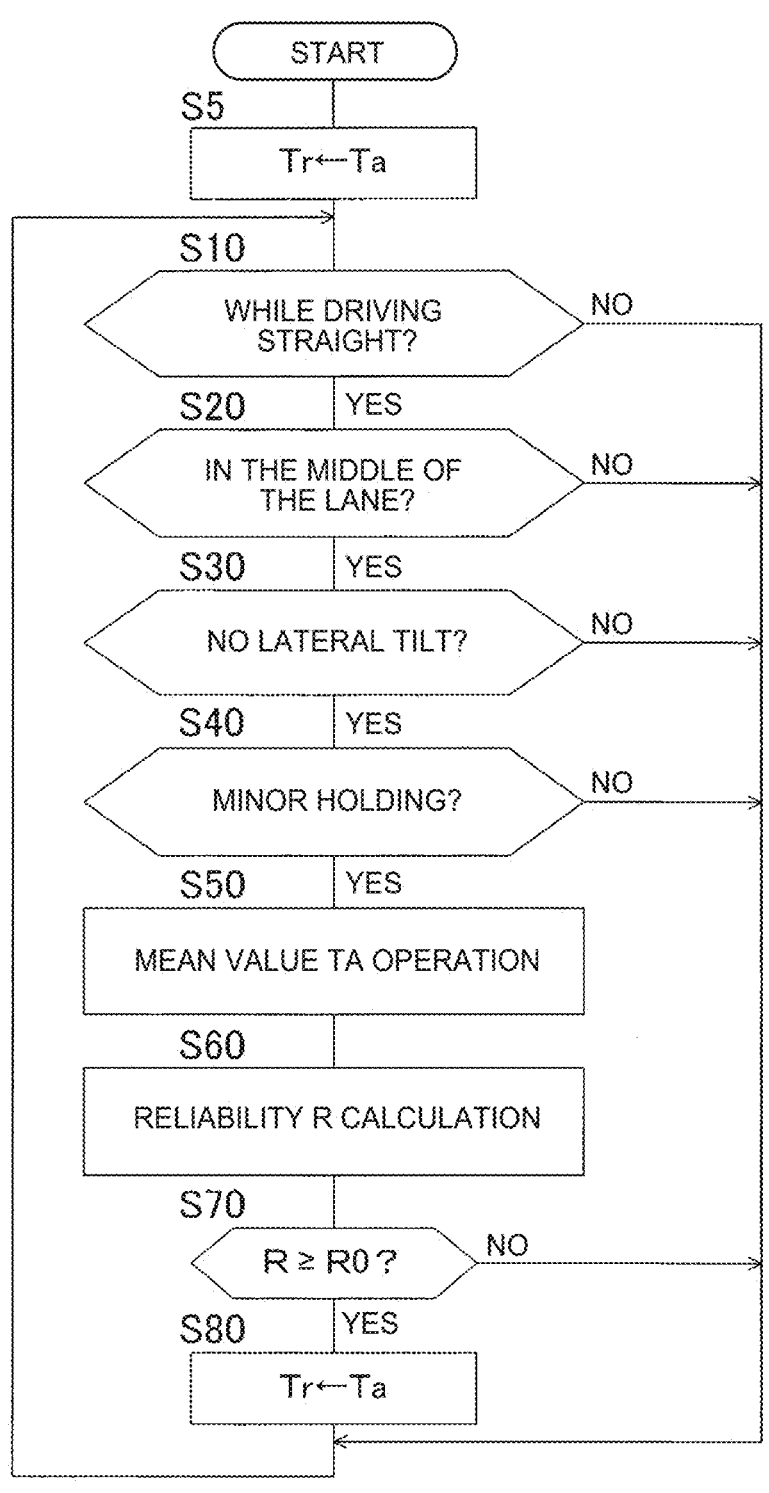
FIG. 4 is a flowchart illustrating a hands-free state determination control routine according to the third embodiment.

In the third embodiment, ROM of the steering assistance ECU 50 stores a program of reference value Tr calculation control corresponding to the flow chart shown in of FIG. 4. The reference value Tr calculation control according to the flow chart shown in FIG. 4 is repeatedly executed at predetermined intervals by CPU of the steering assistance ECU 50 when LTA switch, not shown in of FIG. 1, of the setting operation device 56 is on and LTA is being executed.

As can be seen from a comparison of FIG. 4 with FIGS. 2, S10 to S80 are performed in the same manner as in the first embodiment, and the control is returned to S10 when S80 is completed. Although not shown in FIGS. 4, S100 to S120 of the first and second embodiments are executed as a hands-free state determination routine different from the routines of S10 to S80. The same applies to the fourth embodiment described later.

Further, in the third embodiment, when the traveling of the vehicle 102 is completed, the mean value Ta of the steering torque Ts calculated in S50 is stored in the non-volatile memory. Further, at the beginning of the present control, the reference value Tr used for the determination in S100 is set to the mean value Ta stored in the non-volatile memory in S5 prior to S10.

Fourth Embodiment

Figure 5:
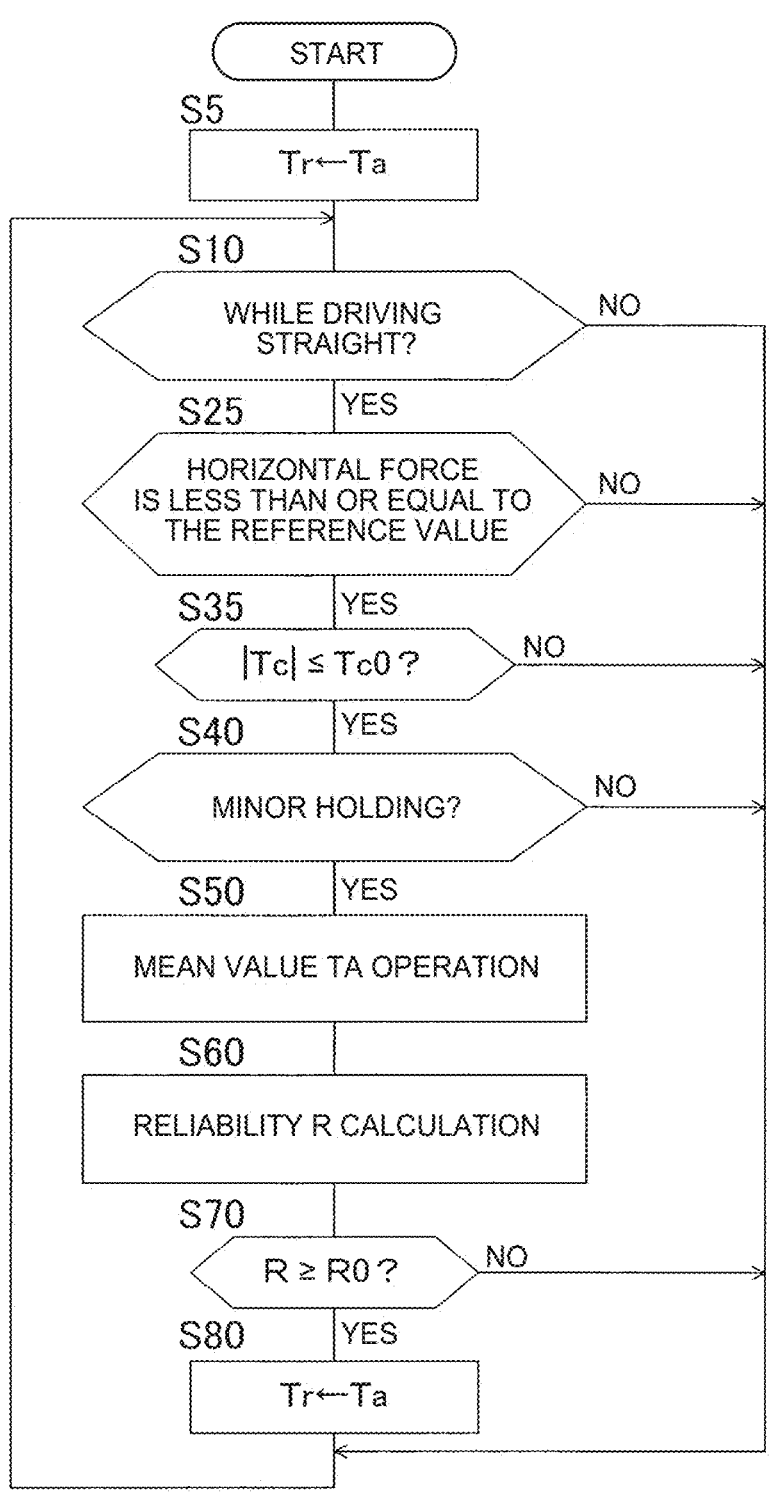
FIG. 5 is a flow chart showing a hands-free state determination control routine of the fourth embodiment.

In the fourth embodiment, ROM of the steering assistance ECU 50 stores a program of reference value Tr calculation control corresponding to the flow chart shown in of FIG. 5. The reference value Tr calculation control according to the flow chart shown in FIG. 5 is repeatedly executed at predetermined intervals by CPU of the steering assistance ECU 50 when LTA switch, not shown in of FIG. 1, of the setting operation device 56 is on and LTA is being executed.

As can be seen from a comparison of FIG. 5 with FIGS. 2, S10, S25, S35 and S40 to S80 are executed in the same manner as in the third embodiment, and when an affirmative determination is made in S10, S25 is executed.

Also in the fourth embodiment, similarly to the third embodiment, when the traveling of the vehicle 102 is completed, the mean value Ta of the steering torque Ts calculated in S50 is stored in the nonvolatile memories. Further, at the beginning of the present control, the reference value Tr used for the determination in S100 is set to the mean value Ta stored in the non-volatile memory in S5 prior to S10.

As can be seen from the above explanation, according to the respective embodiments, when it is determined that the torque is not inputted to the steering torque sensor 38, the mean value Ta of the steering torque Ts detected by the steering torque sensor in this situation is calculated, and the reference value Tr is set to the mean value Ta. Further, the first predetermined range for determining the hands-free condition is variably set based on the mean value Ta so that the range is equal to or larger than the lower limit value $Tr-\alpha$ and equal to or smaller than the upper limit value $Tr+\alpha$.

The steering torque Ts detected by the steering torque sensor in a situation where it is determined that the torque is not input to the steering torque sensor 38 is an output error of the steering torque sensor due to a factor such as an assembly error of the steering device.

Therefore, according to each of the embodiments, the first predetermined range can be variably set based on the output error of the steering torque sensor. Therefore, compared with a case where the first predetermined range is not variably set, it is possible to reduce a possibility that a determination as to whether or not the driver is in the manual hands-free state is erroneously determined in a situation where an output error of the steering torque sensor occurs due to a factor such as an assembly error of the steering device.

Figure 6A:
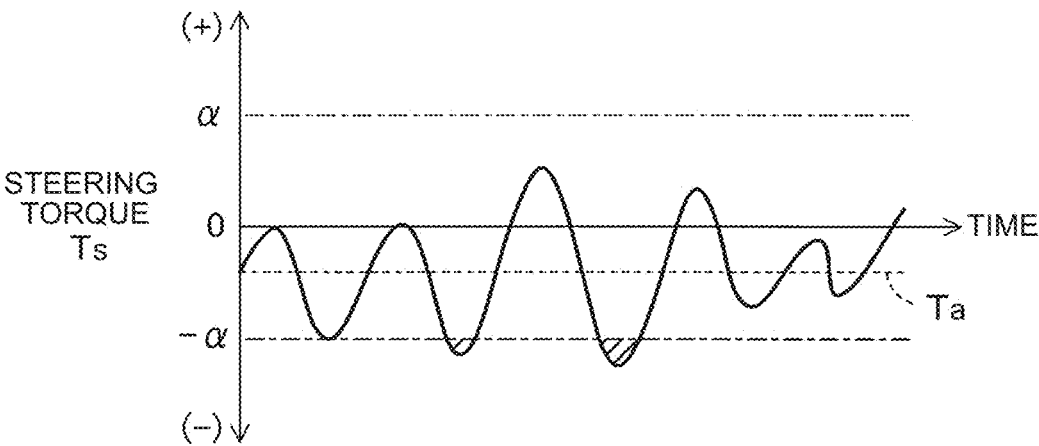
FIG. 6A is a diagram illustrating an example of a hands-free state determination in a conventional case in which the reference value Tr is not variably set.
Figure 6B:
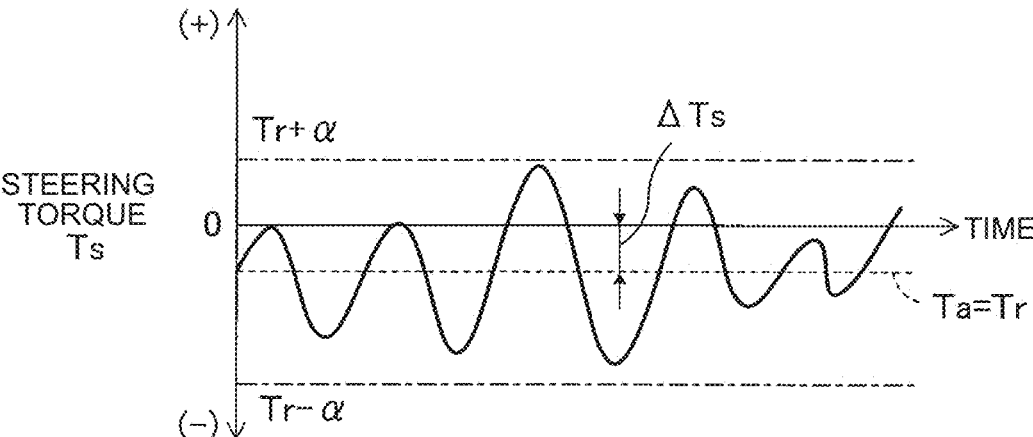
FIG. 6B is a diagram showing an example of a hands-free state determination when the reference value Tr is variably set according to the present disclosure.

For example, FIG. 6A shows an exemplary hands-free state determination in the conventional case where the reference value Tr is not variably set. FIG. 6B shows a case of hands-free state determination where the reference value Tr is variably set according to the present disclosure. In FIGS. 6A and 6B, a broken line indicates an mean value Ta of the steering torque Ts detected by the steering torque sensor, and the mean value Ta is $\Delta Ts$ ($\Delta Ts$ is a negative value). It is assumed that the reference value Tr in the conventional case in which the reference value Tr is not variably set is 0 as in the case of the conventional hands-free state determination device.

In the conventional case in which the reference value Tr is not variably set, even when the driver is in the hands-free state, it is determined that the steering torque Ts exceeds the first predetermined range in an area (hatched area) in which the steering torque Ts is smaller than the lower limit value-a of the predetermined range, and it is erroneously determined that the driver is holding the steering wheel 14.

On the other hand, according to the respective embodiments, the reference value Tr is set to the mean value Ta, and the first predetermined range for determining the hands-free state is set to a range equal to or larger than the lower limit value $Tr-\alpha$ and equal to or smaller than the upper limit value $Tr+\alpha$. Therefore, even in the hatched area in which the reference value Tr is not variably set, it is determined that the steering torque Ts does not exceed the predetermined range, and it can be determined that the driver is in the hands-free state.

In particular, according to the embodiments, the reliability R is calculated so as to increase as the number of times the torque is determined not to be inputted to the steering torque sensor 38 increases, and when the reliability R is equal to or greater than the reference value R0, the reference value Tr is set to the mean value Ta. Therefore, the reference value Tr can be made closer to the value of the steering torque Ts to be originally outputted by the steering torque sensor 38 than when the reference value Tr is set to the mean value Ta without considering the number of times the torque is determined not to be inputted to the steering torque sensor 38. Therefore, it is possible to accurately determine whether or not the driver is in the hands-free state as compared with the case where the reference value Tr is set to the mean value Ta regardless of the reliability R.

The present disclosure has been described in detail above with respect to specific embodiments and modifications. However, it is obvious to those skilled in the art that the present disclosure is not limited to the above-described embodiments and modifications, and various other embodiments are possible within the scope of the present disclosure.

For example, in the above-described embodiments, the steering assistance control is LTA, but may be any steering assistance control that controls the lateral position of the vehicle with respect to the lane by auto-steering, such as lane departure prevention control and lane change assistance control.

Further, in the embodiment, LTA is performed on the assumption that the driver is not in the hands-free condition, in other words, that the driver is holding the steering wheel. However, the steering assistance control such as LTA may be executed regardless of whether or not the driver is in the hands-free state, and a determination may be made as to whether or not the driver is in the hands-free state when the steering assistance control is terminated.

In addition, the first to fourth embodiments described above are executed independently of each other. However, at least one of S20 and S30 of the first embodiment may be incorporated in the second embodiment. Conversely, at least one of S25 and S35 of the second embodiment may be incorporated in the first embodiment.

Similarly, at least one of S20 and S30 of the third embodiment may be incorporated in the fourth embodiment. Conversely, at least one of S25 and S35 of the fourth embodiment may be incorporated in the third embodiment.

Further, in the first and third embodiments, when a negative determination is made in any of S10 to S40, the reliability R may be lowered or reset to 0. Similarly, in the second and fourth embodiments, when a negative determination is made in either S10, S25, S35 or S40, the reliability R may be decreased or reset to 0.

What is claimed is:

1. A hands-free state determination device for a vehicle, the hands-free state determination device comprising:
   a torque imparting device that is configured to impart a control torque to a steering transmission system between a steering wheel and a steered wheel;
   a steering torque sensor that is provided in the steering transmission system, between the steering wheel and the torque imparting device; and
   a control unit that is configured to determine that a driver is in a hands-free state, in which the driver is not gripping the steering wheel, when a steering torque detected by the steering torque sensor is within a first predetermined range, wherein the control unit is configured to perform a variable setting of the first predetermined range, based on the steering torque detected by the steering torque sensor, in a situation in which determination is made that no torque is being input to the steering torque sensor; wherein
   the control unit is configured to determine that no torque is being input to the steering torque sensor from the steered wheel side, when determining that the vehicle is traveling straight, and that the vehicle is traveling in a middle of a lane, and that a road surface is not laterally inclined.

2. The hands-free state determination device according to claim 1, wherein:
   the first predetermined range is a range between a value obtained by subtracting a predetermined value from a reference torque and a value obtained by adding the predetermined value to the reference torque; and
   the control unit is configured to perform the variable setting of the first predetermined range by setting the steering torque detected by the steering torque sensor as the reference torque in the situation in which determination is made that no torque is being input to the steering torque sensor.

3. The hands-free state determination device according to claim 1, wherein the control unit is configured to determine that no torque is being input to the steering torque sensor from the steered wheel side, when determining that the vehicle is in a state of traveling straight, and that a magnitude of a lateral force acting on the vehicle is no greater than a reference value for lateral force determination, and that a magnitude of the control torque is no greater than a reference value for control torque determination.

4. The hands-free state determination device according to claim 1, wherein the control unit is configured to determine that no torque is being input to the steering torque sensor from the steering wheel side, when the steering torque detected by the steering torque sensor is within a second predetermined range that is greater than the first predetermined range, in a situation in which no torque is being input to the steering torque sensor from the steered wheel side.

5. A hands-free state determination device for a vehicle, the hands-free state determination device comprising:
   a torque imparting device that is configured to impart a control torque to a steering transmission system between a steering wheel and a steered wheel;
   a steering torque sensor that is provided in the steering transmission system, between the steering wheel and the torque imparting device; and
   a control unit that is configured to determine that a driver is in a hands free state, in which the driver is not gripping the steering wheel, when a steering torque detected by the steering torque sensor is within; at predetermined range, wherein the control unit is configured to perform a variable setting of the first predetermined range, based on the steering torque detected by the steering torque sensor in a situation in which determination is made that no torque is being input to the steering torque sensor;
   wherein the control unit is configured to determine that no torque is being input to the steering torque sensor from the steering wheel side, when the steering torque detected by the steering torque sensor is within a second predetermined range that is greater than the first predetermined range, in a situation in which no torque is being input to the steering torque sensor from the steered wheel side.

* * * * *